United States Patent [19]
He et al.

[11] Patent Number: 6,098,088
[45] Date of Patent: Aug. 1, 2000

[54] REAL-TIME PIPELINE FAST FOURIER TRANSFORM PROCESSORS

[75] Inventors: Shousheng He; Mats Torkelsson, both of Lund, Sweden

[73] Assignee: Teracom AB, Sweden

[21] Appl. No.: 09/051,643

[22] PCT Filed: Feb. 26, 1996

[86] PCT No.: PCT/SE96/00246

§ 371 Date: Apr. 20, 1998

§ 102(e) Date: Apr. 20, 1998

[87] PCT Pub. No.: WO97/19412

PCT Pub. Date: May 29, 1997

[30] Foreign Application Priority Data

Nov. 17, 1995 [WO] WIPO .................... PCT/SE95/01371

[51] Int. Cl.[7] ........................................ G06F 17/14
[52] U.S. Cl. ........................................ 708/406; 708/408
[58] Field of Search ........................ 708/406, 408, 708/405, 404

[56] References Cited

U.S. PATENT DOCUMENTS

| | | | |
|---|---|---|---|
| 3,746,848 | 7/1973 | Clary ........................................ | 708/406 |
| 3,892,956 | 7/1975 | Fuss ........................................ | 708/406 |
| 4,563,750 | 1/1986 | Clarke ........................................ | 708/404 |
| 5,293,330 | 3/1994 | Sayegh ........................................ | 708/406 |
| 5,808,925 | 9/1998 | Ito et al. ................................ | 708/406 |

OTHER PUBLICATIONS

"Fourier Transforms in VLSI", Thompson, Clark D., *IEEE Transactions On Computers*, vol. C–32, No. 11, Nov. 1983, pp. 1047–1057.

"A New Expandable 2D Systolic Array for DFT Computation Based on Symbiosis of 1D Arrays", He, Sousheng, and Torkelson, Mats, IEEE, 1995, pp. 12–19.

"Index Mappings for Multidimensional Formultation of the DFT and Convolution", Burrus, C. Sidney, *IEEE Transactions On Acoustics, Speech, And Signal Processing*, vol. ASSP-25, No. 3, Jun. 1997, pp. 239–242.

"A Radix 4 Delay Commutator for Fast Fourier Transform Processor Implementation", Swartzlander, Earl E., Young, Wendell K.W., Joseph, Saul J., *IEEE Journal Of Solid–State Circuits*, vol. SC–19, No. 5, Oct. 1984, pp. 702–709.

"A Fast Single–Chip Implementation of 8192 Complex Point FFT", Bidet E., Castelain D., Joanblanq, C. and Senn, P., *IEEE Journal Of Solid–State Circuits*, vol. 30, No. 3, Mar. 1995, pp. 300–305.

(List continued on next page.)

*Primary Examiner*—David H. Malzahn
*Attorney, Agent, or Firm*—Lerner, David, Littenberg, Krumholz & Mentlik, LLP

[57] ABSTRACT

A real-time pipeline processor, which is particularly suited for VLSI implementation, is based on a hardware oriented radix-$2^2$ algorithm derived by integrating a twiddle factor decomposition technique in a divide and conquer approach. The radix-$2^2$ algorithm has the same multiplicative complexity as a radix-4 algorithm, but retains the butterfly structure of a radix-2 algorithm. A single-path delay-feedback architecture is used in order to exploit the spatial regularity in the signal flow graph of the algorithm. For a length-N DFT transform, the hardware requirements of the processor proposed by the present invention is minimal on both dominant components: Log4N-1 complex multipliers, and N-1 complex data memory.

15 Claims, 5 Drawing Sheets

OTHER PUBLICATIONS

"Principles of Modulation and Channel Coding for Digital Broadcasting for Mobile Receivers", Alard, M. and Lasalle, R., *EBU Review*, Technical No. 224, Aug., 1987, pp. 47–69.

"Pipeline and Parallel–Pipeline FFT Processors for VLSI Implementations", Wold, Erling H. and Despain, Alvin M., *IEEE Transactions On Computers*, vol. C–33, No. 5, May 1984, pp. 414–426.

"Fourier Transform Computers Using CORDIC Iterations", Despain, Alvin M., *IEEE Transactions On Computers*, vol. C–23, No. 10, Oct. 1974, pp. 993–1001.

*Introduction To Digital Signal Processing*, Proakis, John G. and Manolakis, Dimitris G., Macmillan Publishing Company, 1989, preface only.

"A Radix–8 Wafer Scale FFT Processor", Swartzlander, Jr., Earl E., Jain, Vijay, K. and Hikawa, Hiroomi, *Journal of VLSI Signal Processing*, 4, 165–176, Kluwer Academic Publishers (1992), pp. 165–176.

"A Pilelined FFT Processor for Word–Sequential Data", Bi, Guoan and Jones, E.V., *IEEE Transactions On Acoustics, Speech, And Signal Processing*, vol. 37, No. 12, Dec. 1989, p. 1982–1985.

"Very Fast Fourier Transform Algorithms Hardware for Implementation", Despain, Alvin M., *IEEE Transactions On Computers*, vol. C–28, No. 5, May 1979, pp. 333–341.

"Radix–2 FFT–Pipeline Architecture With Reduced Noise–To–Signal Ratio", Storn, R., *IEE Proc.–Vis. Image Signal Process*, vol. 141, No. 2, Apr. 1994, pp. 81–86.

REAL-TIME PIPELINE FAST FOURIER TRANSFORM PROCESSORS

The present invention relates to real-time pipeline fast fourier transform processors and, in particular, such processors based on a radix-$2^2$ algorithm.

Pipeline digital fourier transform processors are a specified class of processors used to perform DFT computations. A real-time pipeline processor is a processor whose processing speed matches the input data rate, i.e. the data acquisition speed for continuous operation. For an FFT processor, this means that a length 'N' DFT must be computed in 'N' clock cycles since the data acquisition speed is one sample per cycle. Pipeline operation enables a partial result, obtained from a preceding stage of the processor, to be immediately used in a following stage, without delay.

FFT processors find application, inter alia, in digital mobile cellular radio systems where there exists considerable constraints on power consumption and chip size. The primary constraining factor may, therefore, be chip complexity, in terms of the number of adders, the number of multipliers, data storage requirements and control complexity, rather than speed of operation.

The present invention emerges from a new approach to the design of real-time pipeline FFT processors. The architecture of a real-time FFT processor, according to the present invention, can be described as a radix-$2^2$ single-path delay feedback, or R2$^2$SDF, architecture. Such a processor can operate on the basis of a hardware oriented radix-$2^2$ algorithm, developed by integrating a twiddle factor decomposition technique in a divide and conquer approach to form a spatially regular signal flow graph. In a divide and conquer technique the computation of a DFT is decomposed into nested DFTs of shorter length. Divide and conquer techniques are well known in the derivation of fast algorithms and, in the case of the present invention, refer to approachs in which an N-point DFT is decomposed into successively smaller DFTs which are then computed separately and combined to give the final result. The twiddle factor refers to intervening phase shift, or rotational factor. In the present invention, two stages of radix-2 decomposition are performed together and re-decomposed, so that the first stage has only trivial factors which do not require multiplication. However, it should be noted that the two steps are not computed simultaneously.

The algorithm used in the present invention is referred to as a radix-$2^2$ algorithm because it has the same multiplicative complexity as a radix-4 algorithm but requires radix-2 butterflies in its signal flow graph. The architecture of the processor is described as a single-path delay feedback because only a single data path exists between butterfly stages and each butterfly uses a FIFO buffer in the feedback loop. The signal flow graph is described as spatially regular, because only every alternate column in the SFG has a non-trivial multiplicative operation. This contrasts with an ordinary radix-2 SFG in which there is a non-trivial multiplication in every column in the SFG.

A pipeline DFT processor is characterised by real-time continuous processing of the data sequence passed to the processor. The time complexity of the processor is N and, therefore, it is an AT$^2$ non-optimal approach with AT$^2$=O (N$^3$), since the area lower bound is O(N). However, in ["Fourier transform in VLSI" - C. D. Thompson, *IEEE Trans. Comput.*, C-32(11):1047–1057, Nov. 1983], it has been suggested that for real-time processing a new metric should be introduced, since it is necessarily non-optimal given the time complexity of O(N). Although asymptotically almost all the feasible approaches have reached the area lower bound, [see S. He and M. Torkelson "A new expandable 2D systolic array for DFT computation based on symbiosis of 1D arrays" *Proc. ICA$^3$PP'95*, pages 12–19, Brisbane Australia Apr 1995], one particular class of pipeline processors with the application of recursive Common Factor Algorithm, (collectively known as Fast Fourier Transform), [see C. S. Burrus "Index mapping for multidimensional formulation of the DFT and convolution" - *IEEE Trans. Acoust., Speech, Signal Processing*, ASSP-25(3) :239–242 June 1977], has probably the smallest "constant factor" among the approaches that meet the time requirement, due to the least number, 0(logN), of processing elements. The difference comes from the fact that an arithmetic unit, especially the multiplier, takes up a much larger area than a digital register in digital VLSI design.

It should be noted that at least $\Omega$(logN) PEs, with multipliers, are needed to meet the real-time processing requirements due to the multiplicative computational complexity of $\Omega$(NlogN) for FFT algorithms. Thus, this is in the nature of a "lower bound" for multiplier requirements. Any optimal architecture for real-time processing will probably have $\Omega$(logN) multipliers.

Another major chip area and energy consumer, for a FFT processor, is the memory requirement for buffering the input data and intermediate results for the computation. For large transforms, this is a dominant factor, [see E. E. Swartzlander et al. "A radix-4 delay commutator for fast Fourier transform processor implementation" *IEEE J. Solid-State Circuits*, SC-19(5):702–709 October 1984; and E. Bidet et al. "A fast single-chip implementation of 8192 complex point FFT" *IEEE J. Solid-State Circuits*, 30(3):300–305 March 1995]. Although there is no formal proof, the area lower bound indicates that the lower bound for the number of registers is likely to be $\Omega$(N). This is obviously true for any architecture implementing an FFT based algorithm, since the butterfly at the first stage has to take data elements separated by N/r, from the input sequence, where r is a small constant integer, or the radix.

Combining the above arguments suggests a pipeline FFT processor with $\Omega$(log$_r$N) PEs, or multipliers, and $\Omega$(N) complex word registers. The optimal architecture has to be one that reduces the constant factor, or the absolute number of arithmetic units (multipliers and adders) and memory size, to the minimum.

Some of the known architectures for pipeline processors will now be considered. In order to prevent the comparison between different architectures being affected by sequence order, it will be assumed that the real-time processing task only requires the input time sequence to be in normal order and that the output can be in digit reversed (radix-2, or radix-4) order. This is permissible in such applications as DFT based communication systems, [see M. Alard and R. Lassalle "Principles of modulation and Channel Coding for digital broadcasting and mobile receivers" *EBU Review* (224):47–69 August 1987]. DIF type decompositions are used throughout.

The architecture design for pipeline FFT Processors has been the subject of intensive research since the '70s, when a need for real-time processing was identified in such applications as radar signal processing, [see L. R. Rabiner and B. Gold "Theory and Application of Digital Signal Processing" - Prentice-Hall 1975], well before VLSI technology had advanced to the level of system integration. Several architectures have been proposed over the last two decades. These architectures are briefly reviewed below using a unified terminology and functional block diagrams in which the additive butterfly is separated from the multiplier to clearly indicate the hardware requirements. The control and twiddle factor reading mechanism has been omitted for clarity. All data and arithmetic operations are complex and N is a power of 4.

Figure 1:
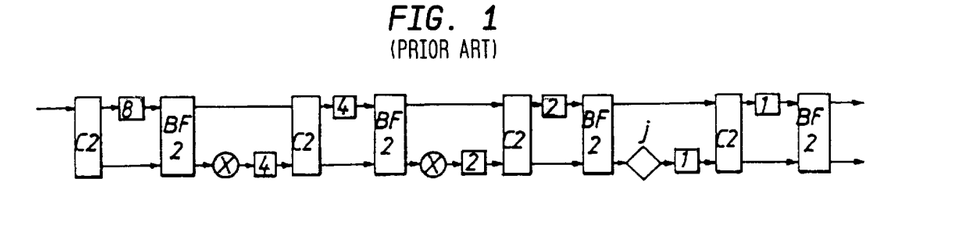
FIG. 1 illustrates a known architecture for a pipeline FFT processor designated as R2MDC.

A R2MDC processor is illustrated in FIG. 1 of the accompanying drawings, [see L. R. Rabiner and B. Gold "Theory and Application of Digital Signal Processing" - Prentice-Hall 1975]. This is a radix-2 Multi-path Delay Commutator architecture which is probably the most straight forward approach to pipeline implementation of a radix-2 FFT algorithm. The input sequence is broken into two parallel data streams flowing forward, with the correct distance between data elements entering the butterfly, scheduled by proper delays. Both butterflies and multipliers are 50% utilised. The processor uses $log_2N$-2 multipliers, $log_2N$ radix-2 butterflies and 3/2N-2 registers (delay elements).

Figure 2:
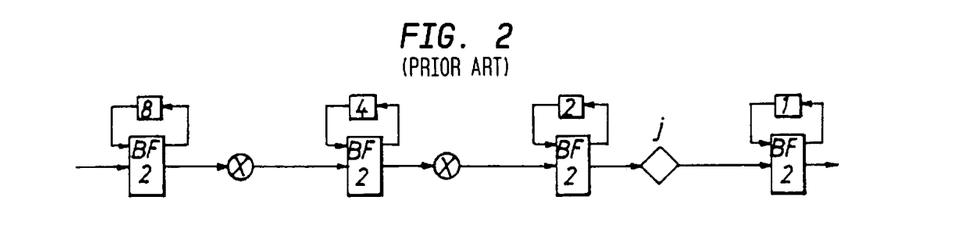
FIG. 2 illustrates a known architecture for a pipeline FFT processor designated as R2SDF.

A R2SDF processor is illustrated in FIG. 2 of the accompanying drawings, [E. H. Wold and A. M. Despain "Pipeline and parallel-pipeline FFT processors for VLSI implementation *IEEE Trans. Comput.* C-35(5):414–426 May 1984]. This processor uses a radix-2 single path delay-feedback architecture, in which a more efficient use is made of registers, by storing the intermediate butterfly outputs in feedback shift registers. A single data stream passes through the multipliers at every stage. This architecture employs the same number of butterfly units and multipliers as the R2MDC architecture, but has a much reduced memory requirement, namely N-1 registers. In fact the memory requirement can be described as minimal.

Figure 3:
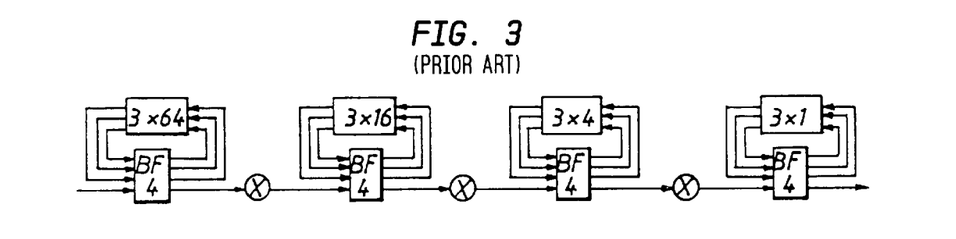
FIG. 3 illustrates a known architecture for a pipeline FFT processor designated as R4SDF.

A R4SDF processor is illustrated in FIG. 3 of the accompanying drawings, [see A. M. Despain "Fourier transform computer using CORDIC iterations" *IEEE Trans Comput.* C-23(10):993–101 October 1974]. This processor uses a radix-4 single path delay feedback architecture and is a radix-4 version of the R2SDF architecture employing CORDIC (Coordinated Rotational Digital Computer) iterations. The multiplier utilisation is increased to 75% because of intermediate storage of 3 out of the 4 radix-4 butterfly outputs. However, the utilisation of the radix-4 butterfly, which is fairly complicated and requires at least 8 complex adders to implement, falls to 25%, [see J. G. Proakis and D. G. Manolakis "*Introduction to Signal Processing*" Macmillan 1989]. A processor implemented in this architecture requires $log_4N$-1 multipliers, $log_4N$ full radix-4 butterflies and storage of size N-1.

Figure 4:
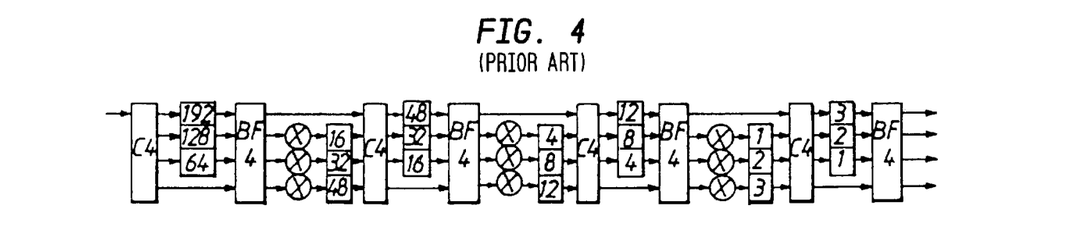
FIG. 4 illustrates a known architecture for a pipeline FFT processor designated as R4MDC.

A R4MDC processor is illustrated in FIG. 4 of the accompanying drawings, [see L. R. Rabiner and B. Gold "*Theory and Application of Digital Signal Processing*" - Prentice-Hall 1975]. This processor uses a radix-4 multi-path delay commutator architecture and is a radix-4 version of the R2MDC architecture. It was used as the architecture for the initial implementation of pipeline FFT processors, [see E. E. Swartzlander et al. "A radix 4 delay commutator for fast Fourier transform processor implementation" *IEEE J. Solid-State Circuits,* SC-19(5):702–709 October 1984], and massive wafer scale integration, [see E. E. Swartzlander et al "A radix 8 wafer scale FFT processor" *J. VLSI Signal Processing* 4(2,3):165–176 May 1992]. However, it suffers from a low, 25%, utilisation of all components. This can only be compensated for in some special applications where four FFTs are being processed simultaneously. Implementation of this processor requires $3log_4N$ multipliers, $log_4N$ full radix-4 butterflies and 5/2N-4 registers.

Figure 5:
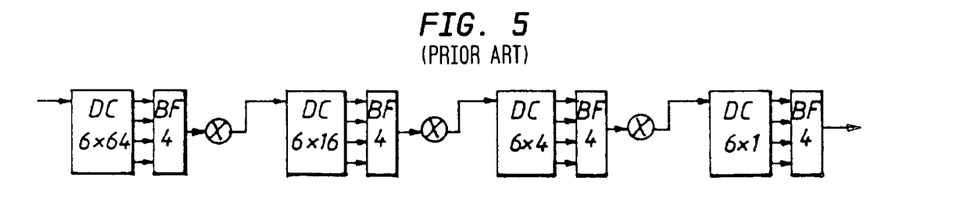
FIG. 5 illustrates a known architecture for a pipeline FFT processor designated as R4SDC.

A R4SDC processor is illustrated in FIG. 5 of the accompanying drawings, [see G. Bi and E.. V. Jones "A pipelined FFT processor for word-sequential data" *IEEE Trans Acoust., Speech, Signal Processing,* 37(12) :1982–1985 December 1989]. This processor uses a radix-4 single-path delay commutator architecture together with a modified radix-4 algorithm with programmable ¼ radix-4 butterflies to achieve a higher, 75%, utilisation of multipliers. A combined delay-commutator also reduces the memory requirements, in comparison with the R4MDC architecture, to 2N-2, from 5/2N-1. The butterfly and delay commutator become relatively complicated because of the programmability requirements. The R4SDC architecture has found application in building large single chip pipeline FFT processors for HDTV.

A comparison of the processors described above reveals the distinctive advantages and disadvantages of the different architectures. The delay feedback architectures are always more efficient than the corresponding delay-commutator architectures in terms of memory utilisation, because the stored butterfly outputs can be directly used by the multipliers. Radix-4 algorithm based single-path architectures have a higher multiplier utilisation. However, radix-2 architectures have simpler butterflies which are more efficiently utilised. The present invention is based, at least in part, on these observations.

The present invention is a real-time pipeline processor which is particularly suited for VLSI implementation. The processor is based on a hardware oriented radix-$2^2$ algorithm derived by integrating a twiddle factor decomposition technique in a divide and conquer approach. The radix $2^2$ algorithm has the same multiplicative complexity as a radix-4 algorithm, but retains the butterfly structure of a radix-2 algorithm. A single-path delay-feedback architecture is used in order to exploit the spatial regularity in the signal flow graph of the algorithm. For a length-N DFT transform, the hardware requirements of the processor proposed by the present invention is minimal on both dominant components: $Log_4N$-1 complex multipliers, and N-1 complex data memory.

According to a first aspect of the present invention, there is provided a real-time pipeline fast fourier transform processor, characterised in that said processor includes a plurality of paired first and second butterfly means, each of said first butterfly means and each of said second butterfly means having a feedback path between an output therefrom to an input thereto, in that each of said paired butterfly means is linked by a multiplier to an adjacent one of said plurality of paired first and second butterfly means, in that an input data sequence is applied to an input of a first one of said plurality of paired first and second butterfly means, and in that an output data sequence is derived from a last one of said plurality of paired first and second butterfly means.

Preferably, said processor is realised on a VLSI chip.

Preferably, said processor operates on a radix-$2^2$ algorithm having the same multiplicative complexity as a radix-4 algorithm but employing radix-2 butterflies.

Preferably, only a single data path exists between each butterfly means.

Said first butterfly means may be radix-2 single delay feedback butterflies, and said second butterfly means may be radix-2 single delay feedback butterflies including logic circuitry to implement trivial twiddle factor multiplications.

Said processor may include a synchronisation control means and an address means for twiddle factor reading for each processor stage.

Said first butterfly means may include two adders, two subtractors, and four 2-to-1 multiplexers.

Said second butterfly means may include at least one adder, at least one subtractor, at least two 2-to-1 multiplexers, a 2×2 commutator, and an AND gate with one inverting input and one non-inverting input.

Control signals derived from said synchronisation control means may be applied to the inputs to said AND gate.

Said synchronisation control means and said address means may be implemented as a single binary counter.

A pipeline register may be located between each multiplier and a following butterfly means.

Said processor may include shimming registers for adjusting control signal timing.

Preferably, for a digital fourier transform of length N, said processor includes no more than $\log_4 N - 1$ multipliers, $4\log_4 N$ adders, and a memory size of N-1.

Said processor may be arranged to handle a 256 point FFT, and said processor may have four processing stages in said pipeline, each processing stage separated by a multiplier, each processing stage comprising a first butterfly means with a feedback register, and a second butterfly means with a feedback register.

Said first butterfly means in said first stage may have a one hundred and twenty eight word feedback register, said second butterfly means in said first stage may have a sixty four word feedback register, said first butterfly means in said second stage may have a thirty two word feedback register, said second butterfly means in said second stage may have a sixteen word feedback register, said first butterfly means in said third stage may have an eight word feedback register, said second butterfly means in said third stage may have a four word feedback register, said first butterfly means in said fourth stage may have a two word feedback register and said second butterfly means in said fourth stage may have a one word feedback register.

According to a second aspect of the present incention, there is provided a real-time pipeline fast fourier transform processor, characterised in that said processor operates on a radix-$2^2$ algorithm having the same multiplicative complexity as a radix-4 algorithm but employing radix-2 butterflies, and in that for a digital fourier transform of length N, said processor includes no more than $\log_4 N - 1$ multipliers, $4\log_4 N$ adders, and a memory size of N-1.

Embodiments of the invention will now be described, by way of example, with reference to the accompanying drawings, in which.

To facilitate an understanding of the present invention a glossary of the abbreviations used in the specification is set out below:

$<.>_N$: denotes a residue modulo-N operation, e.g. $<7>_3 = 1$ and $<7>_4 = 3$ $\Omega(.)$: lower bound in asymptotic analysis $AT^2$: reference to area-time complexity CFA: Common Factor Algorithm DFT: Digital, or Discete, Fourier Transform DIF: Decimation In Frequency (algorithm)—where a fast algorithm is derived using a divide and conquer approach, if the first step is to divide the input data sequence into a first and second half, equivalent to separating the frequency points by even and odd number, the algorithm is described as a DIF algorithm—in the SFG the frequency points will be in bit-reversed order DIT: Decimation In Time (algorithm)—where a fast algorithm is derived using a divide and conquer approach, if the first step is to divide the input data sequence into two, according to its even and odd numbered points, the algorithm is described as a DIT algorithm—in the SFG the input will be in bit reversed order FIFO: First In First Out R$2^2$SDF: Radix-$2^2$ Single-path Delay Feedback FFT: Fast Fourier Transform Metric: the Hamming distance between two code words—enables a determination of whether, or not, an architecture is optimal to be made O(.): upper bound in asymptotic analysis $O(N^2)$: means that the growth rate, for N sufficiently large, is no greater than $N^2$ PE: Processing Element SDF: Single-path Delay Feedback SFG: Signal Flow Graph VLSI: Very Large Scale Integration From the observations made in the introduction to this patent specification, it can be seen that a comparison of different architectures for pipeline FFT processors shows that the most desirable hardware oriented algorithm will have the same number of non-trivial multiplications, at the same position in the flowgraph, as a radix-4 algorithm, but will retain the butterfly structure of a radix-2 algorithm. This feature appears in a number of known algorithms. A SFG has been obtained, within a complex "bias" factor, as a result of a constant-rotation/compensation procedure using restricted CORDIC operations, [see A. M. Despain "Very fast Fourier transform algorithms hardware for implementation" *IEEE Trans. Comput.* C-28(5):333–341 May 1979]. Another algorithm combining radix-4 and radix-'4+2', in DIT form, has been used to reduce the scaling noise in a R2MDC architecture, without altering the multiplier requirement, [see R. Storn "Radix-2 FFT-pipeline architecture with reduced noise-to-signal ratio" *IEE Proc. -Vis. Image Signal Process.* 141(2):81–86 April 1994]. A clear derivation of an algorithm in DIF form directed to the reduction of hardware requirements in the context of pipeline FFT processors has, until now, not been derived.

To avoid confusion with the well known radix-2/4 algorithm and the mixed radix-'4+2' FFT algorithm, [see E. O. Brigham "*The fast Fourier transform and its applications*" Prentice-Hall 1988], the algorithm on which the present invention is based is referred to as the radix-$2^2$ algorithm. This notation clearly reflects the structural relationship of this algorithm to the radix-2 algorithm and the identity between the computational requirements of this algorithm and the radix-4 algorithm.

A DFT of size N is defined by:

$$X(k) = \sum_{n=0}^{N-1} x(n) W_N^{nk} \quad 0 \le k < N \tag{1}$$

where $W_N$ denotes the Nth primitive root of unity, with its exponent evaluated modulo N. The DFT coefficients are "rotating factors", which are constant length vectors in the complex plane with different phase, or rotation angles. The constant-rotation/compensation procedure proposed by Despain is based on the idea that given a complex bias, all angles can be rotated by successive rotations of a fixed, constant angle. This bias can be compensated at the final stage of the computation. To make the derivation of the new algorithm clearer, consider the first 2 steps in a radix-2 DIF FFT decomposition together. Applying a 3-dimensional linear map, $$n = \left\langle \frac{N}{2} n_1 + \frac{n}{4} n_2 + n_3 \right\rangle N \tag{2}$$
$$k = \langle k_1 + 2k_2 + 4k_3 \rangle N$$

the CFA algorithm has the form of $$X(k_1 + 2k_2 + 4k_3) = \sum_{n_3=0}^{\frac{N}{4}-1} \sum_{n_2=0}^{1} \sum_{n_1=0}^{1} x\left(\frac{N}{2}n_1 + \frac{N}{4}n_2 + n_3\right) W_N^{(\frac{N}{2}n_1 + \frac{N}{4}n_2 + n_3)(k_1 + 2k_2 + 4k_3)} \tag{3}$$

$$= \sum_{n_3=0}^{\frac{N}{4}-1} \sum_{n_2=0}^{1} \left\{ \left[ x\left(\frac{N}{4}n_2 + n_3\right) + (-1)^{k_1} x\left(\frac{N}{4}n_2 + n_3 + \frac{N}{2}\right) \right] W_N^{(\frac{N}{4}n_2 + n_3)k_1} \right\} T$$

where $T = W_N^{(\frac{N}{4}n_2 + n_3)(2k_2 + 4k_3)}$

If the expression within the braces is computed with a butterfly structure before further decomposition, an ordinary radix-2 DIF FFT will be obtained. The key concept behind the new algorithm is to extend the second stage of decomposition to the remaining DFT coefficients, including the twiddle factor $$W_N^{(\frac{N}{4}n_2 + n_3)k_1}$$

to exploit the exceptional values in multiplication before the butterfly is constructed. Decompose the composite twiddle factor observing that:-

$$W_N^{(\frac{N}{4}n_2 + n_3)(k_1 + 2k_2 + 4k_3)} = W_N^{Nn_2 k_3} W_N^{\frac{N}{4}n_2(n_1 + 2k_2)} W_N^{n_3(k_1 + 2k_2)} W_N^{2n_3 k_3} \tag{4}$$

$$= (-j)^{n_2(k_1 + 2k_2)} W_N^{n_3(k_1 + 2k_2)} W_N^{4n_3 k_3}$$

Substituting equation (4) into equation (3) and expanding the summation with index $n_2$, yields, after simplification, a set of four DFTs of length N/4, $$X(k_1 + 2k_2 + 4k_3) = \sum_{n_3=0}^{\frac{N}{4}-1} \left[ H(k_1, k_2, n_3) W_N^{n_3(k_1 + 2k_2)} \right] W_{\frac{N}{4}}^{n_3 k_3} \tag{5}$$

where $$H(k_1, k_2, n_3) = \left[ x(n_3) + (-1)^{k_1} \left( n_3 + \frac{N}{2} \right) \right] + \tag{6}$$
$$(-j)^{(K_1 + 2k_2)} \left[ x\left(n_3 + \frac{N}{4}\right) + (-1)^{k_1} x\left(n_3 + \frac{3}{4}N\right) \right]$$

Figure 6:
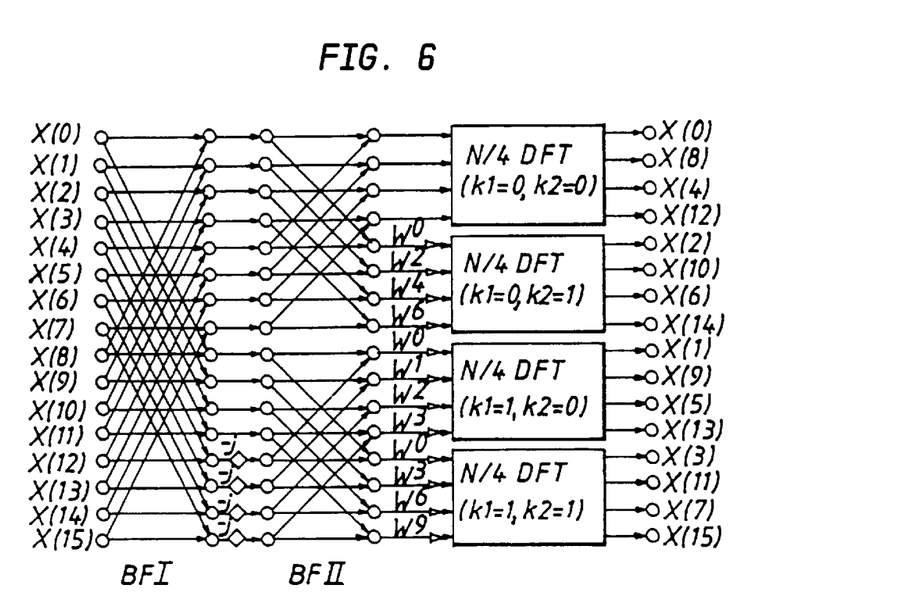
FIG. 6 illustrates a radix-2 butterfly structure, for the present invention, obtained by twiddle factor decomposition.

The expressions in [ ] on the right hand side of equation (6) represent a first butterfly BF I, the entire expression on the right hand side of equation (6) represents a second butterfly BF II. Equation (6) represents the first two stages of butterflies with only trivial multiplication in the flow graph, as BF I and BF II, in FIG. 6. After these two stages, full multipliers are required to compute the multiplications by the decomposed twiddle factor:

$$W_N^{n_3(k_1 + 2k_3)}$$

in equation 6, as shown in FIG. 6. It should be noted that the order of the twiddle factors is different from that of a radix-4 algorithm.

Figure 7:
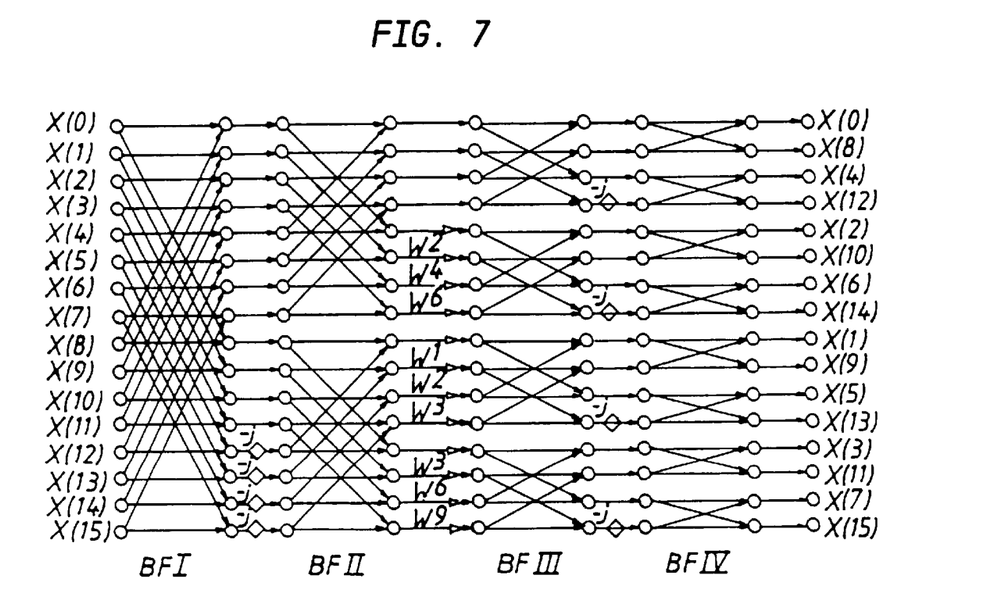
FIG. 7 is a radix-$2^2$ DIF FFT flow graph for N=16.
Figure 8A:
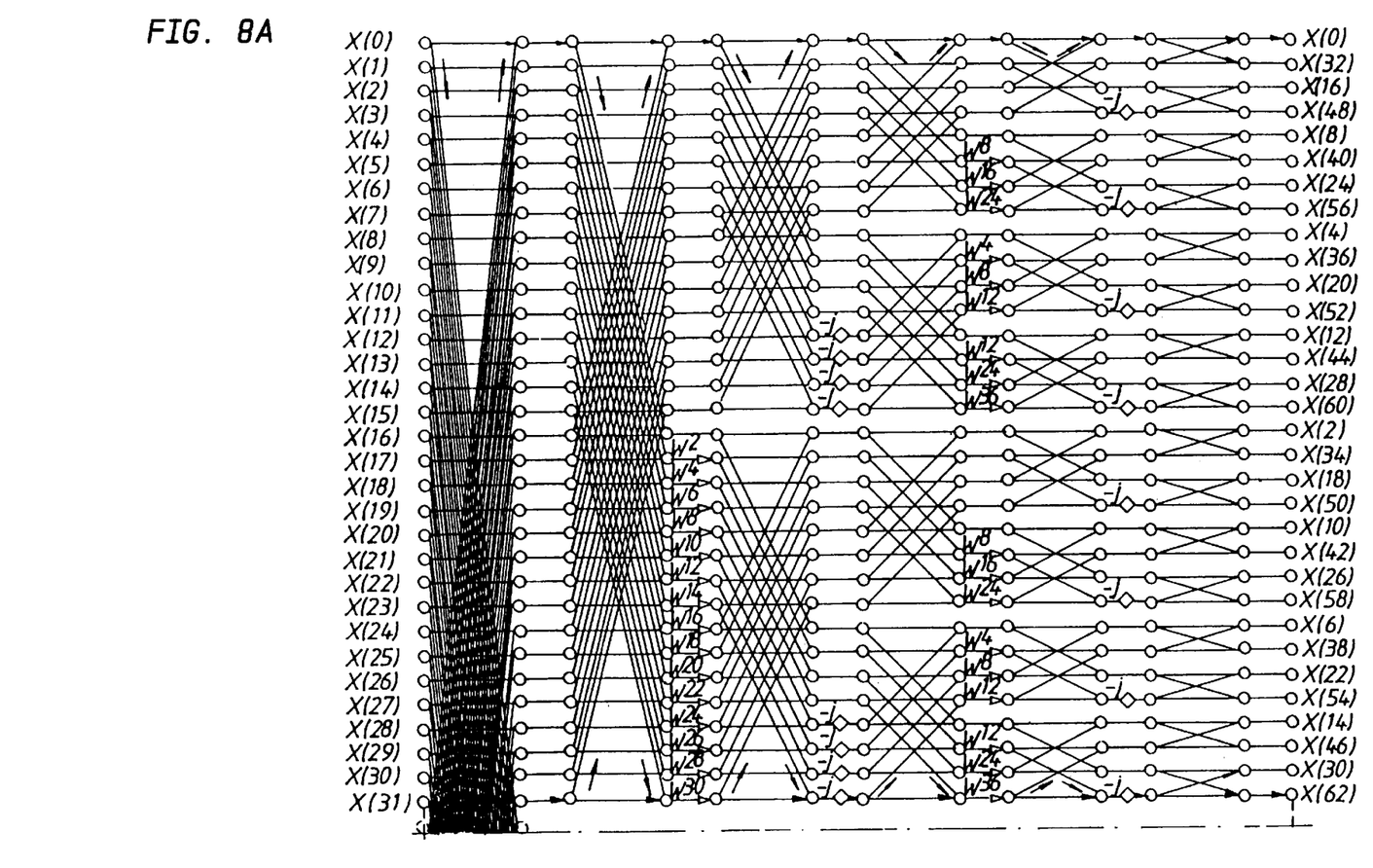
FIG. 8 is a radix-$2^2$ DIF FFT flow graph for N=64.
Figure 8B:
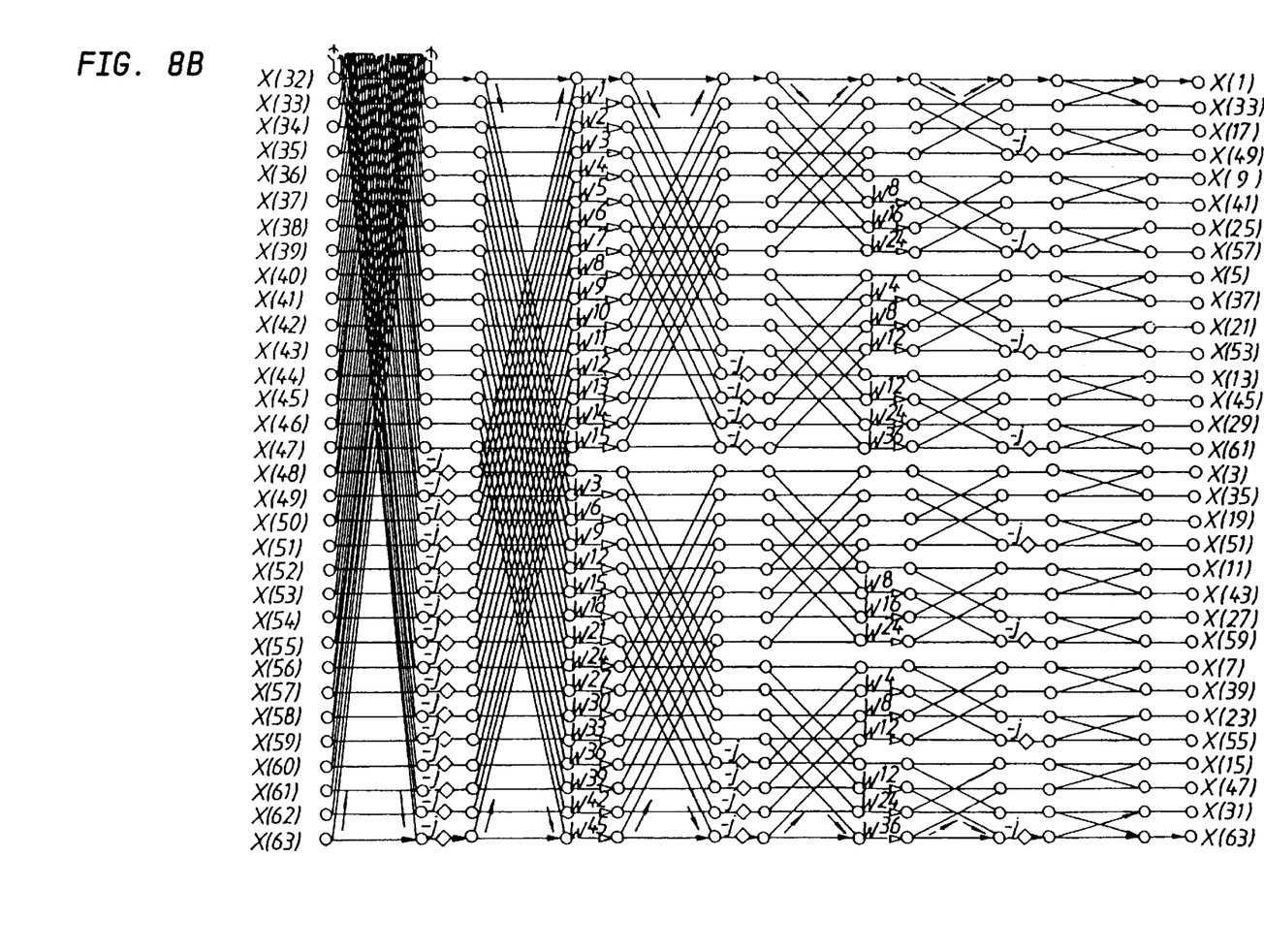

Applying this CFA procedure recursively to the remaining DFTs of length N/4 in equation (5), yields the complete radix-$2^2$ DIF FFT algorithm. An N=16 example is shown in FIG. 7 and an N=64 example is shown in FIG. 8. In FIG. 8 the small diamonds represent trivial multiplication by:

$$W_N^{\frac{N}{4}} = -j$$

which involves only real-imaginary swapping and sign inversion.

The radix-$2^2$ algorithm has the same multiplicative complexity as the radix-4 algorithm, but retains the radix-2 butterfly structure. The multiplicative operations are so arranged that only every other stage has non-trivial multiplications. This is a substantial structural advantage over other algorithms when pipeline/cascade FFT architectures are considered.

By applying the radix-$2^2$ DIF FFT algorithm, derived above, to a R2SDF architecture, the new and efficient radix-$2^2$SDF architecture of the present invention is obtained. This architecture requires a minimum of hardware resource, compared with the known architectures discussed in the introduction to this specification, because of the reduced multiplicative complexity and the preservation of spatial regularity for both additive and multiplicative operations in the SFG, as shown in FIGS. 7 and 8.

Figure 9:
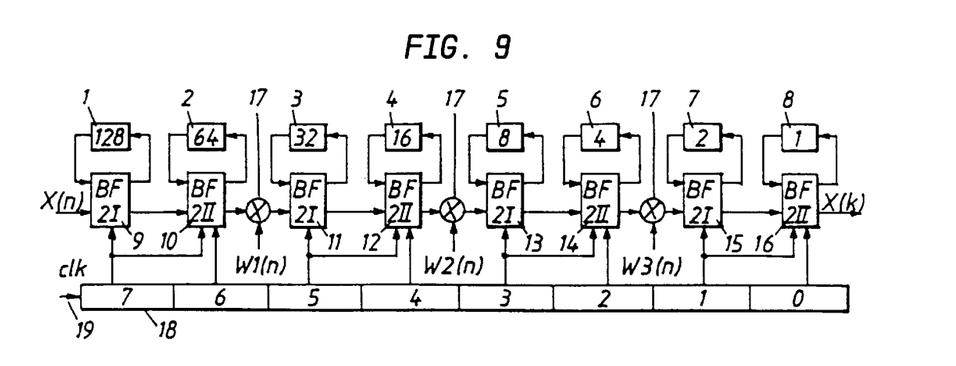
FIG. 9 illustrates a R$2^2$SDF pipeline FFT architecture for N=256, according to the present invention.

FIG. 9 illustrates the architecture of a real-time pipeline FFT processor, according to the present invention, for N=256. The similarity between the data path in this processor and the R2SDF architecture and the reduced number of multipliers should be noted.

Referring now to FIG. 9, the input data sequence is passed to the first, 9, of a pair butterfly units, 9 and 10. A one hundred and twenty eight word feedback register, 1, links the output of butterfly 9, to its input. The second butterfly unit 10 has a sixty four word feedback register 2. Multiplier 17 links the first stage of the processor, comprising butterfly units 9 and 10 to the second stage of the processor comprising butterfly units 11 and 12, and multiplies the data stream by the twiddle factor W1(n). It should be noted at this point that the structure of butterfly units 9, 11, 13 and 15, differs from butterfly units 10, 12, 14, and 16, see below. Butterfly units 11 and 12 are provided with feedback registers 3 and 4 having a thirty two word and sixteen word capacity respectively. A multiplier 17, located between the second and third stage of the processor, multiplies the data stream by twiddle factor W2(n). The third stage of the processor comprises butterflies 13 and 14, together with eight word feedback register 5 and four word feedback register 6. Again a multiplier 17, located between the third and fourth stages, of the processor multiplies the data stream by twiddle factor W3(n). The fourth stage of the processor comprises butterfly units 15 and 16 together with two word feedback register 7 and one word feedback register 8. The output sequence, X(k) is derived from the output of the fourth stage of the processor. The binary counter 18, is clocked by a clock signal 19. The binary counter 18 acts as a synchronisation controller and address counter for the twiddle factors used between each stage of the processor.

The two types of butterfly used in the processor are BF2I and BF2II. The BF2I butterfly is similar to the R2SDF butterfly. The BF2II butterfly contains the logic needed to implement the trivial twiddle factor multiplications. Because of the spatial regularity of the radix-$2^2$ algorithm, the synchronisation control of the processor is particularly simple and is, as described above, implemented with a ($\log_2 N$)-bit counter.

Figure 10:
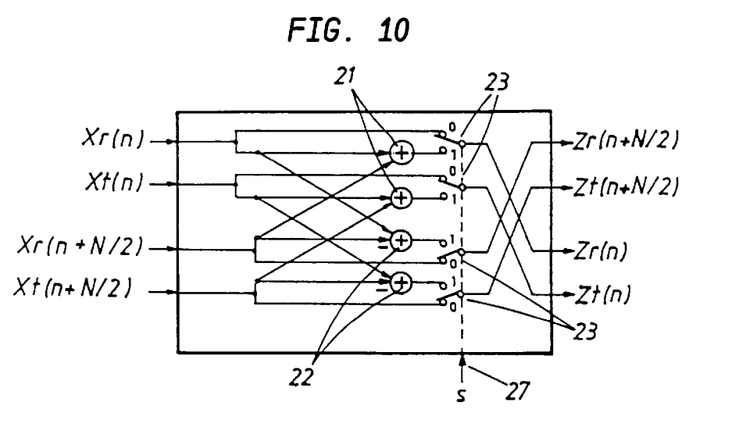
FIG. 10 illustrates a first butterfly structure used in a R$2^2$SDF pipeline FFT processor according to the invention.

The type BF2I butterfly is illustrated in FIG. 10. The butterfly unit comprises two adders, 21, two subtractors, 22, and four multiplexers 23, connected as shown in FIG. 10. Operation of the multiplexers is controlled by control signal 27, as will be explained later.

Figure 11:
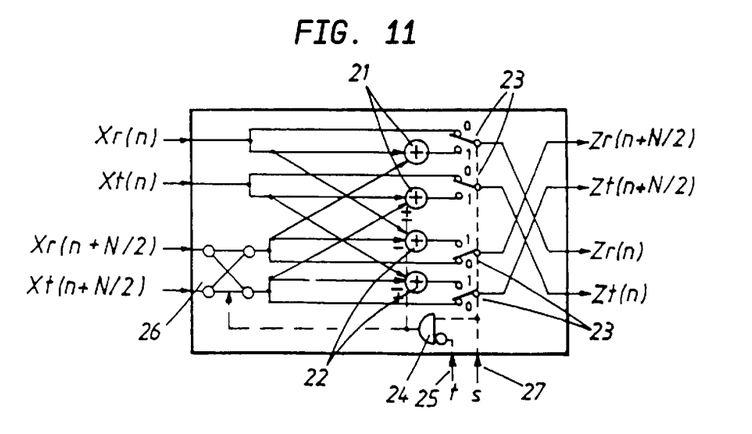
FIG. 11 illustrates a second butterfly structure used in a R$2^2$SDF pipeline FFT processor according to the invention.

The type BF2II butterfly is illustrated in FIG. 11. It is similar in construction to the type BF2I butterfly, but with the addition of a 2×2 commutator, 26, and a logic gate, 24. The logic gate. 24 is an AND gate with one inverted input. Control signal 25 is applied to the inverted input of AND gate 24, and control signal, 27, which is also applied to the multiplexers 23, is applied to the non-inverted input of AND gate 24. The output from AND gate 24 drives commutator 26.

The scheduled operation of the R2$^2$SDF processor is as follows. On the first N/2 cycles, the 2-to-1 multiplexers, 23, in the first butterfly module switch to position "0", and the butterfly is idle. The input data from the left is directed to the shift registers until they are filled. On the next N/2 cycles, the multiplexers, 23, turn to position "1", the butterfly unit computes a 2-point DFT with the incoming data and the data stored in the shift registers.

$$Z1(n)=x(n)+x(n+N/2)$$

$$0 \leq n < N/2 \tag{7}$$

$$Z1(n+N/2)=x(n)-x(n+N/2)$$

The butterfly output Z1(n) is sent to apply the twiddle factor and Z1(n+N/2) is sent back to the shift registers to be "multiplied" in the next N/2 cycles when the first half of the next frame of the time sequence is loaded. The operation of the second butterfly is similar to that of the first one, except the "distance" of the butterfly input sequence is just N/4 and the trivial twiddle factor multiplication is implemented by real-imaginary swapping by commutator 26 and controlled add/subtract operations. This requires a two bit control signal, 25 and 27, from the synchronising counter, 18. The data then passes through a full complex multiplier, 17, working at 75% utility, to produce the results of the first level of radix-4 DFT word by word. Further processing repeats this pattern with the distance of the input data decreasing by half at each consecutive butterfly stage. After N-1 clock cycles, the complete DFT transform result streams out to the right of processor, see FIG. 9, in bit-reversed order. The next frame of the transform can then be processed without pausing, because of the pipelined processing at each stage of the processor.

In a practical implementation of the radix-$2^2$SDF processor, pipeline registers should be inserted between each multiplier and butterfly stage to improve performance. Shimming registers are also needed so that the control signals comply with the revised timing. The latency of the output is then increased to N-1+3($\log_4 N$-1) without affecting the throughput rate.

The hardware requirements of radix-$2^2$SDF processor architecture, as compared with known architectures, is set out in the table below, which lists the number of complex multipliers, adders, memory size and control complexity.

|        | multiplier # | adder #        | memory size | control  |
|--------|--------------|----------------|-------------|----------|
| R2MDC  | 2($\log_4 N$-1) | 4$\log_4 N$  | 3N/2-2      | simple   |
| R2SDF  | 2($\log_4 N$-1) | 4$\log_4 N$  | N-1         | simple   |
| R4SDF  | $\log_4 N$-1    | 8$\log_4 N$  | N-1         | medium   |
| R4MDC  | 3($\log_4 N$-1) | 8$\log_4 N$  | 5N/2-4      | simple   |
| R4SDC  | $\log_4 N$-1    | 3$\log_4 N$  | 2N-2        | complex  |
| R2$^2$SDF | $\log_4 N$-1 | 4$\log_4 N$  | N-1         | simple   |

The table shows that the R2$^2$SDF architecture has reached the minimum requirement for both multipliers and storage requirements, and is second, with regard to the number of adders, to only the R4SDC architecture. This means that the R2$^2$SDF architecture is ideal for the VLSI implementation of pipeline FFT processors.

What is claimed is:

1. A real-time pipeline fast fourier transform processor, comprising a plurality of paired first and second butterfly means, each of said first butterfly means and each of said second butterfly means having a feedback path between an output therefrom to an input thereto, said paired butterfly means linked by a multiplier to an adjacent one of said plurality of paired first and second butterfly means, said first butterfly means comprising radix-2 single delay feedback butterflies, said second butterfly means comprising radix-2 single delay feedback butterflies and logic circuitry to implement trivial twiddle factor multiplications, whereby an input data sequence is applied to an input of a first one of said plurality of paired first and second butterfly means, and an output data sequence is derived from a last one of said plurality of paired first and second butterfly means.

2. A real-time pipeline fast fourier transform processor as claimed in claim 1, wherein said processor comprises a VLSI chip.

3. A real-time pipeline fast fourier transform processor as claimed in claim 1 or 2, wherein said butterflies are radix-2 butterflies and said processor operates on a radix-$2^2$ algorithm having the same multiplicative complexity as a radix-4 algorithm.

4. A real-time pipeline fast fourier transform processor as claimed in claim 1 or 2 wherein only a single data path exists between each butterfly means.

5. A real-time pipeline fast fourier transform processor as claimed in claim 1 wherein said processor comprises a synchronisation control means and an address means for twiddle factor reading for each processor stage.

6. A real-time pipeline fast fourier transform processor as claimed in claim 5 wherein said first butterfly means comprises two adders, two subtractors, and four 2-to-1 multiplexers.

7. A real-time pipeline fast fourier transform processor as claimed in claim 5 or 6 wherein said second butterfly means comprises at least one adder, at least one subtractor, at least two 2-to-1 multiplexers, a 2×2 commutator, and an AND gate with one inverting input and one non-inverting input.

8. A real-time pipeline fast fourier transform processor as claimed in claim 7, wherein control signals derived from said synchronisation control means are applied to the inputs to said AND gate.

9. A real-time pipeline fast fourier transform processor as claimed in claim 5 or 6 wherein said synchronisation control means and said address means are implemented as a single binary counter.

10. A real-time pipeline fast fourier transform processor as claimed in claim 1 further comprising a pipeline register located between each multiplier and following butterfly means.

11. A real-time pipeline fast fourier transform processor as claimed in claim 10, wherein said processor includes shimming registers for adjusting control signal timing.

12. A real-time pipeline fast fourier transform processor as claimed in claim 1 wherein for a digital fourier transform of length N, said processor includes no more than $\log_4 N - 1$ multipliers, $4\log_4 N$ adders, and a memory size of N-1.

13. A real-time pipeline fast fourier transform processor as claimed in claim 1 wherein said processor is arranged to handle a 256 point FFT, said processor has four processing stages in said pipeline, each processing stage being separated by a multiplier, and each processing stage comprises a first butterfly means with a feedback register and a second butterfly means with a feedback register.

14. A real-time pipeline fast fourier transform processor as claimed in claim 13, wherein said first butterfly means in said first stage has a one hundred and twenty eight word feedback register, said second butterfly means in said first stage has a sixty four word feedback register, said first butterfly means in said second stage has a thirty two word feedback register, said second butterfly means in said second stage has a sixteen word feedback register, said first butterfly means in said third stage has an eight word feedback register, said second butterfly means in said third stage has a four word feedback register, said first butterfly means in said fourth stage has a two word feedback register and said second butterfly means in said fourth stage has a one word feedback register.

15. A real-time pipeline fast fourier transform processor, said processor operating on a radix-$2^2$ algorithm having the same multiplicative complexity as a radix-4 algorithm, said processor comprising radix-2 butterflies, and said processor comprising no more than $\log_4 N - 1$ multipliers, 4log4N adders, and a memory size of N-1 where N is the length of the digital fourier transform.

* * * * *

UNITED STATES PATENT AND TRADEMARK OFFICE
CERTIFICATE OF CORRECTION

PATENT NO. : 6,098,088
DATED : Aug. 1, 2000
INVENTOR(S) : He et al.

It is certified that error appears in the above-identified patent and that said Letters Patent is hereby corrected as shown below:

Title Page, in the Abstract, line 12, "Log4N-1" should read --Log$_4$N-1--.

Col. 12, line 28, "4log4N" should read --4log$_4$N--.

Signed and Sealed this

Seventeenth Day of April, 2001

Attest:

NICHOLAS P. GODICI

Attesting Officer

Acting Director of the United States Patent and Trademark Office